US 12,510,980 B2

(12) United States Patent
Lu et al.

(10) Patent No.: US 12,510,980 B2
(45) Date of Patent: Dec. 30, 2025

(54) ACTIVE STYLUS

(71) Applicants: DEXIN CORP., New Taipei (TW); Renaisser Technology Co., Ltd., Hsinchu County (TW)

(72) Inventors: Ho-Lung Lu, New Taipei (TW); Yeh Sen-Fan Chueh, Hsinchu County (TW); Tzu-Yu Ting, Hsinchu County (TW)

(73) Assignees: DEXIN CORP., New Taipei (TW); Renaisser Technology Co., Ltd., Hsinchu County (TW)

( * ) Notice: Subject to any disclaimer, the term of this patent is extended or adjusted under 35 U.S.C. 154(b) by 0 days.

(21) Appl. No.: 18/638,808

(22) Filed: Apr. 18, 2024

(65) Prior Publication Data

US 2024/0353938 A1 Oct. 24, 2024

Related U.S. Application Data

(60) Provisional application No. 63/496,713, filed on Apr. 18, 2023.

(51) Int. Cl.
*G06F 3/0354* (2013.01)
(52) U.S. Cl.
CPC ............................... *G06F 3/03545* (2013.01)
(58) Field of Classification Search
CPC .. G06F 3/03545; G06F 3/0383; G06F 3/0442; G06F 2203/0384
See application file for complete search history.

(56) References Cited

U.S. PATENT DOCUMENTS

| | | | | |
|---|---|---|---|---|
| 2009/0084614 A1* | 4/2009 | Fukushima | ......... | G06F 3/03545 178/19.03 |
| 2010/0212976 A1* | 8/2010 | Baba | .................. | G06F 3/03545 178/19.01 |
| 2015/0193021 A1* | 7/2015 | Chen | .................... | G06F 3/03545 345/179 |
| 2022/0147161 A1* | 5/2022 | Jung | ...................... | G06F 3/0383 |
| 2022/0397968 A1* | 12/2022 | Lien | ...................... | G01L 5/0038 |
| 2024/0077959 A1* | 3/2024 | Chueh | ................... | G06F 3/0383 |
| 2024/0094834 A1* | 3/2024 | Lee | ......................... | B43K 29/08 |

FOREIGN PATENT DOCUMENTS

| | | | | |
|---|---|---|---|---|
| CN | 218158977 U | * | 12/2022 | ............. G06F 3/016 |
| CN | 218158978 U | * | 12/2022 | ............. B43K 19/08 |

\* cited by examiner

*Primary Examiner* — Temesghen Ghebretinsae
*Assistant Examiner* — Ivelisse Martinez Quiles (57) ABSTRACT

An active stylus includes a tip, a metal pin, a metal shaft, a signal processing module and an elastic ring. A first end of the metal pin is wrapped in the tip. The metal shaft includes an accommodating cavity having an opening. The signal processing module is accommodated in the accommodating cavity. A second end of the metal pin goes through the elastic ring and the opening, and is coupled to the signal processing module. The metal pin is configured to broadcast a touch control signal from the signal processing module with a wireless transmission protocol.

17 Claims, 6 Drawing Sheets

ACTIVE STYLUS

FIELD

The subject matter herein generally relates to an active stylus.

BACKGROUND

The gap between the tip and the shaft of the of the current active stylus does not have dust-proof or impact-proof component. While the active stylus is dropped from a high place and the tip is strongly impacted, by the impact surface, to generate an axial impact force, the axial impact force is harmful to the electronic components in the shaft. Moreover, when a user uses a current active stylus on an electronic device with a touch control panel, the force sensor of the current active stylus is used to generate a sensing signal in response to the pressing applied on the tip.

SUMMARY

The purpose of the present disclosure is to provide an active stylus.

To achieve the above purpose, the current disclosure discloses an active stylus. The active stylus includes a tip, a metal pin, a signal processing module and an elastic ring. The metal pin includes a first end wrapped in the tip shell. The metal shaft includes an accommodating cavity having an opening. The signal processing module is accommodated in the accommodating cavity. The elastic ring is located between the tip and the opening and a second end of the metal pin goes through the elastic ring and the opening, and is coupled to the signal processing module. The metal pin is configured to broadcast a touch control signal from the signal processing module with a wireless transmission protocol.

The current disclosure discloses an active stylus. The active stylus includes a tip, a metal pin and a metal shaft. The metal pin includes a first end wrapped in the tip shell. The metal shaft includes an accommodating cavity having an opening and the accommodating cavity configured to accommodate a pin holder and a sensing module. The pin holder includes a first end formed a holding portion and the holding portion is configured to hold the second end of the metal pin via the opening. The sensing module further includes a metal sheet, a sensor and a micro control unit (MCU).

A second end of the pin holder directly contacts to a first side of the metal sheet and the metal sheet is deformed in response to the axial movement of the pin holder and the metal pin. The sensor is located at a second side of the metal sheet and the sensor is configured to generate a sensing signal in response to sensed deformation of the metal sheet. The first side of the metal sheet is opposed to the second side of the metal sheet.

The micro control unit (MCU) is coupled to the metal sheet by a flexible printed circuit (FPC). The FPC is bonded with the metal sheet by conductive adhesive and the MCU is configured to a control signal in response to the sensing signal. The metal pin is configured to broadcast the touch control signal from the signal processing module with a wireless transmission protocol.

The current disclosure discloses an active stylus. The active stylus includes a tip, a metal pin, a metal shaft and an elastic ring. The metal pin includes a first end wrapped in the tip shell. The metal shaft includes an accommodating cavity having an opening. The accommodating cavity is configured to accommodate a pin holder having a first end formed a holding portion and a sensing module. The elastic ring is located between the tip and the opening. A second end of the metal pin goes through the elastic ring and the opening, and is held by the holding portion;

The sensing module further includes a metal sheet, a sensor and a micro control unit (MCU). A second end of the pin holder directly contacts to a first side of the metal sheet and the metal sheet is deformed in response to the axial movement of the pin holder and the metal pin. The sensor is located at a second side of the metal sheet and the sensor is configured to generate a sensing signal in response to sensed deformation of the metal sheet, wherein the first side of the metal sheet is opposed to the second side of the metal sheet. The MCU is coupled to the metal sheet by a flexible printed circuit (FPC).

The FPC is bonded with the metal sheet by conductive adhesive and the MCU is configured to generate a touch control signal in response to the sensing signal. The metal pin is configured to broadcast the touch control signal from the signal processing module with a wireless transmission protocol.

It should be understood that the description in the section is not intended to identify key or important features of embodiments of the present disclosure, nor is it intended to limit the scope of the present disclosure. Other features of the present disclosure will be readily understood from the following specification.

BRIEF DESCRIPTION OF THE DRAWINGS

In the accompanying drawings, unless otherwise specified, the same reference numerals throughout multiple accompanying drawings indicate the same or similar parts or elements. These accompanying drawings are not necessarily drawn to scale. It should be understood that these accompanying drawings depict only some embodiments disclosed in accordance with the present disclosure and should not be considered as limiting the scope of the present disclosure.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasable connected.

Figure 1:
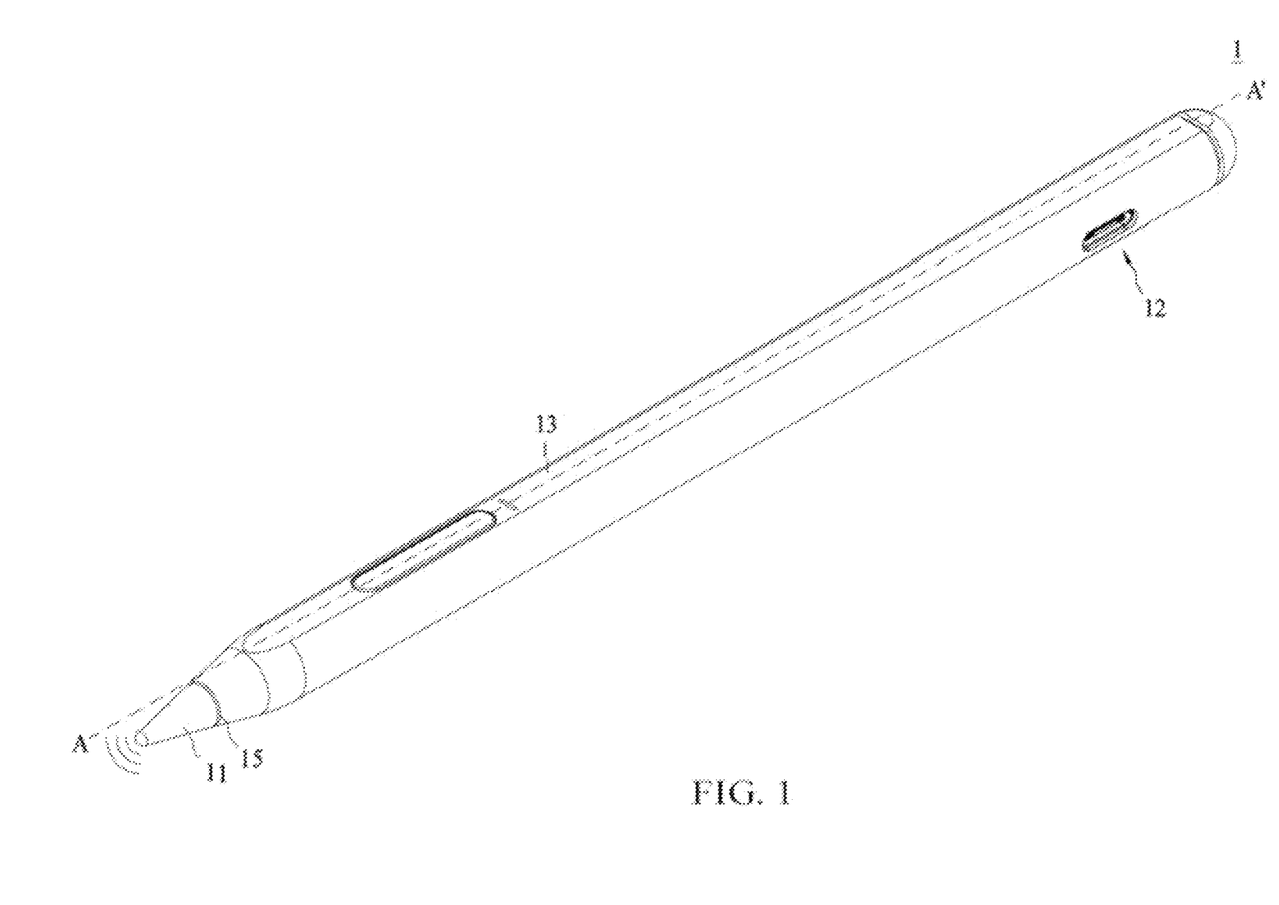
FIG. 1 is a schematic view of an active stylus of one embodiment of the present disclosure.
Figure 2:
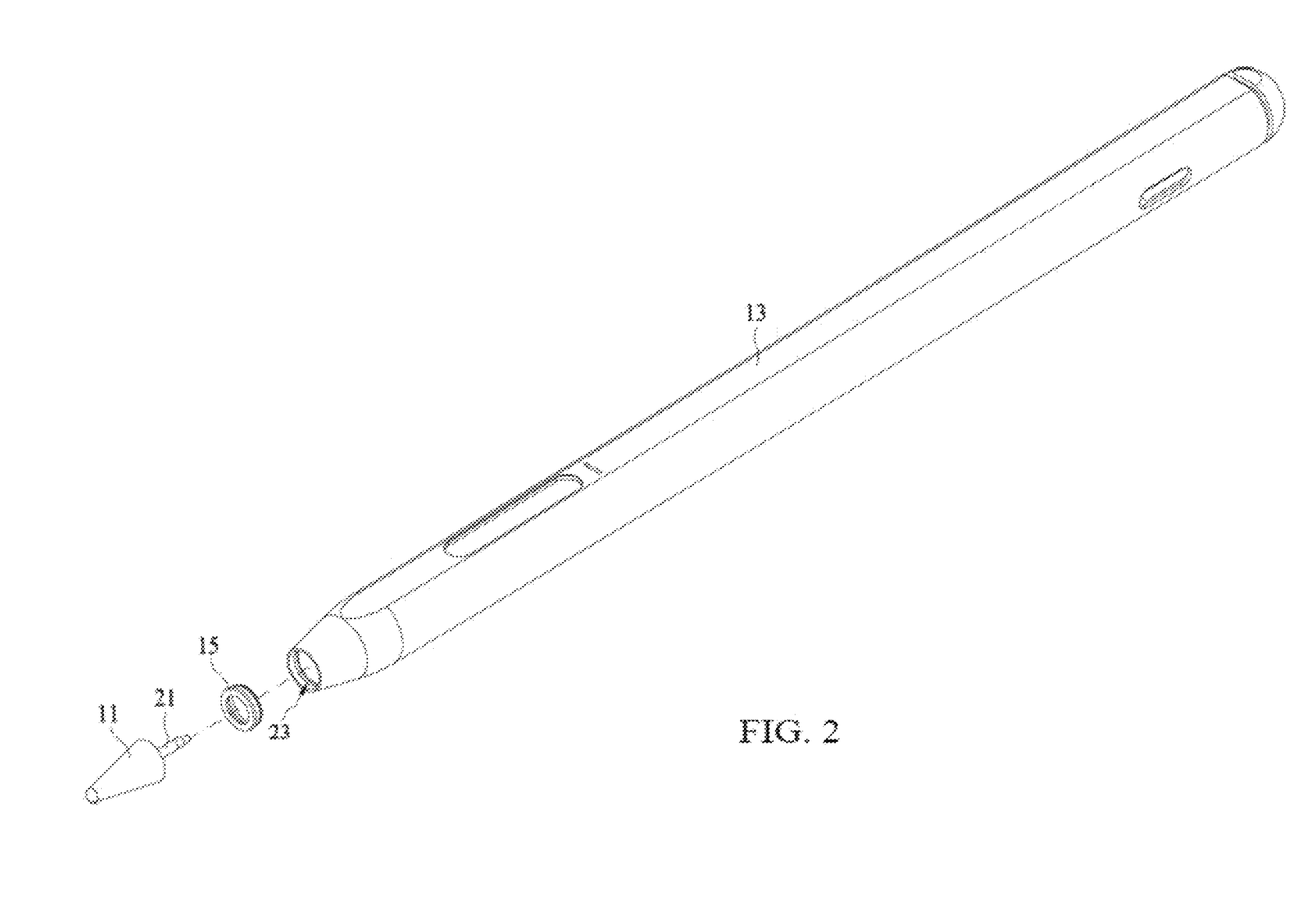
FIG. 2 is an explosion view of the active stylus of FIG. 1.
Figure 3A:
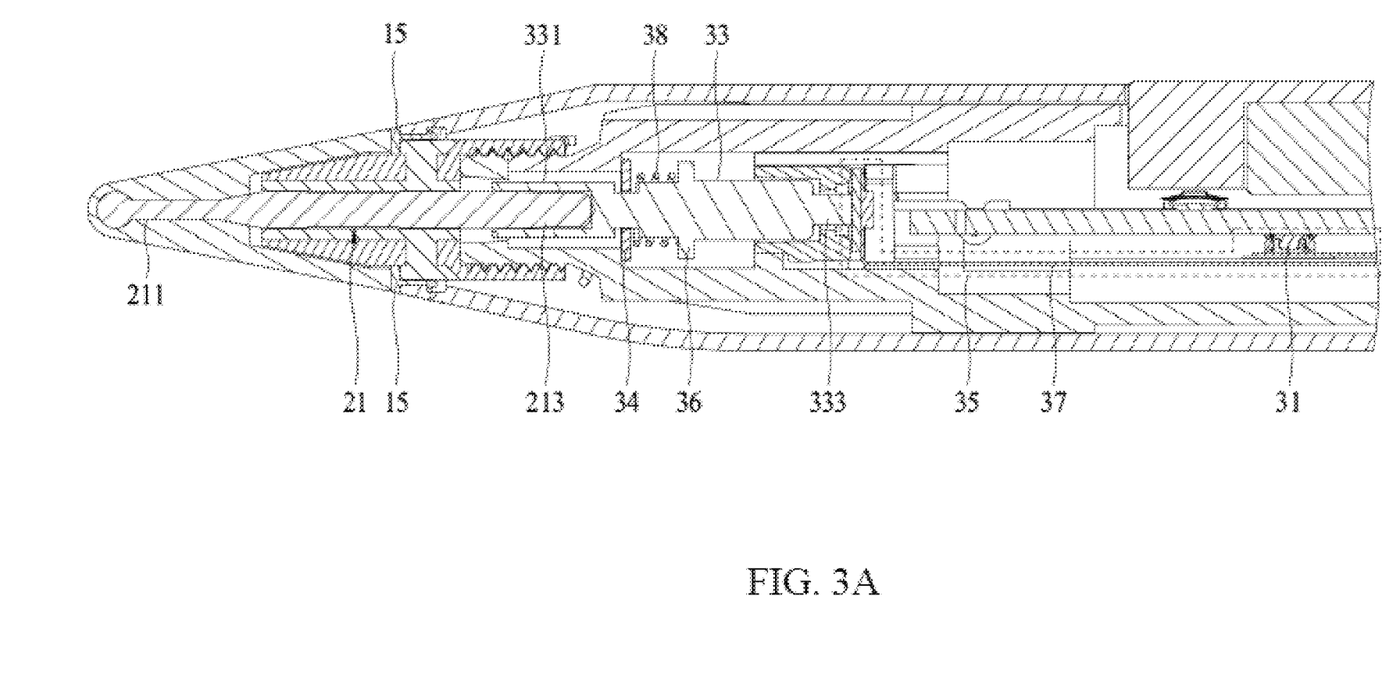
FIG. 3A is a cross-sectional view alone an AA' line of the active stylus of FIG. 1.

FIG. 1 is a schematic view of an active stylus 1 of one embodiment of the present disclosure. FIG. 2 is a schematic explosion view of the active stylus 1 of FIG. 1. FIG. 3A is a cross-sectional view alone an AA' line of the active stylus 1 of FIG. 1. As shown in FIGS. 1 to 3A, the active stylus 1 includes a tip 11, a metal pin 21, a metal shaft 13 and an elastic ring 15. In this embodiment, a first end 211 of the metal pin 21 is wrapped in the tip 11. The metal shaft 13 includes an accommodation cavity. The accommodation cavity has an opening 23. In one embodiment, the elastic ring 15 includes a rubber elastic ring. In one embodiment, the elastic ring 15 includes a silicon elastic ring. In one embodiment, the tip 11 includes a silicon tip. As shown in FIG. 1, in this embodiment, a charging port 12 is configured to allow an external power source to charge the battery of the active stylus 1. In one embodiment, the charging port 12 includes a USB Type-C charging port.

As shown in FIG. 2, a second end 213 of the metal pin 21 goes through the elastic ring 15 and the opening 23, and is coupled to the signal processing module. In this embodiment, the metal pin 21 is configured to broadcast a touch control signal from the signal processing module with a wireless transmission protocol. The elastic ring 15 is configured to cover a gap between the tip 11 and the metal shaft 13 to be as a dust-proof component. The failure possibilities of the active stylus 11, caused by dust, are then substantially reduced. Moreover, while the active stylus 1 is dropped from a high place and the tip 11 is strongly impacted, by the impact surface, to generate an axial impact force, the elastic ring 15 provides impact-proof to prevent the impact force from damaging the internal electronic components of the active stylus 1.

Figure 3B:
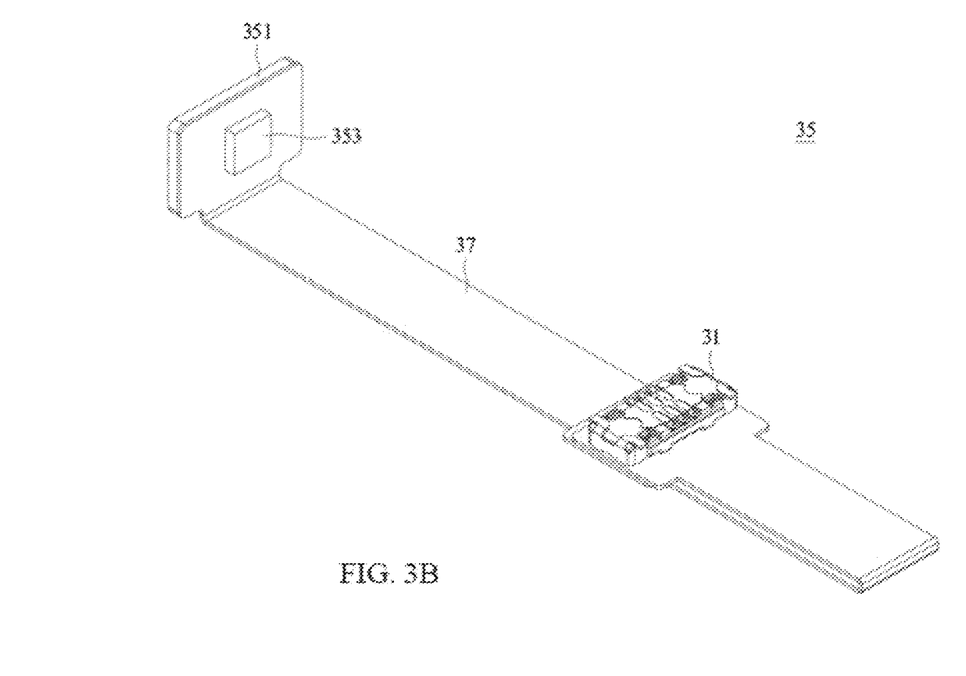
FIG. 3B is a schematic view of a sensing module of the active stylus of FIG. 1.

As shown in FIGS. 3A and 3B, the signal processing module includes a pin holder 33 and a sensing module 35. In this embodiment, a first end of the pin holder 33 is formed a holding portion 331. The holding portion 331 is configured to hold a second end 213 of the metal pin 21. In this embodiment, the sensing module 35 further includes a metal sheet 351, a sensor 353 and a micro control unit (MCU) 31. A second end 333 of the pin holder 33 is directly contacted to a first side of metal sheet 351. The sensor 353 is located on a second side of the metal sheet 351. The first side of the metal 351 is opposite to the second side of the metal sheet 351. In this embodiment, as shown in FIG. 3A, since the second end 333 of the pin holder 33 is directly contact to the first side of the metal sheet, the active stylus 1 only requires a preloaded spring 38 located between a snap ring 34 and clamp blocks 36. Therefore, the preloaded stroke of the active stylus 1 is then reduced.

In this embodiment, the second end 333 of the pin holder 33 presses, in response to the axial movement of the metal pin 21, the first side of the metal sheet 351 and the metal sheet 351 is then deformed. A sensing signal is generated, in response to the sensed deformation of the metal sheet 351, by the sensor 353. In this embodiment, the sensor 353 includes integrated circuits. The metal sheet 351 is coupled to the MCU 31 by a flexible printed circuit (FPC) 37. Moreover, the FPC 37 is bonded with the metal sheet 351 with conductive adhesive. A touch control signal is generated, in response to the sensing signal, by the MCU 31. The touch control signal is transmitted to the metal pin 21 via the FPC 37, the conductive adhesive, the metal sheet 351 and the pin holder 33. The touch control signal is then broadcasted, with a wireless transmission protocol, by the metal pin 21. In this embodiment, the wireless transmission protocol includes Bluetooth.

For example, when a user uses the active stylus 1 to perform touch control actions on a touch control panel of an electronic device, the tip 11 is pressed and the second end of the pin holder 33 then press the metal sheet 351. The metal sheet 351 is deformed in response to the pressing performed by the second end of the pin holder 33. A sensing signal is generated, in response to sensed deformation of the metal sheet 351, by the sensor 353 and transmitted to the MCU 31 via the FPC 37. A touch control signal is generated, in response to the sensing signal, by the MCU 31 and the touch control signal is transmitted, via the FPC 37, the conduct adhesive, the metal sheet 351 and the pin holder 33, to the metal pin 21. The touch control signal is then broadcasted via the metal pin 21 with a wireless transmission protocol. When the touch control signal is received by the electronic device, the information relevant to the received touch control signal is presented on the touch panel.

Figure 4A:
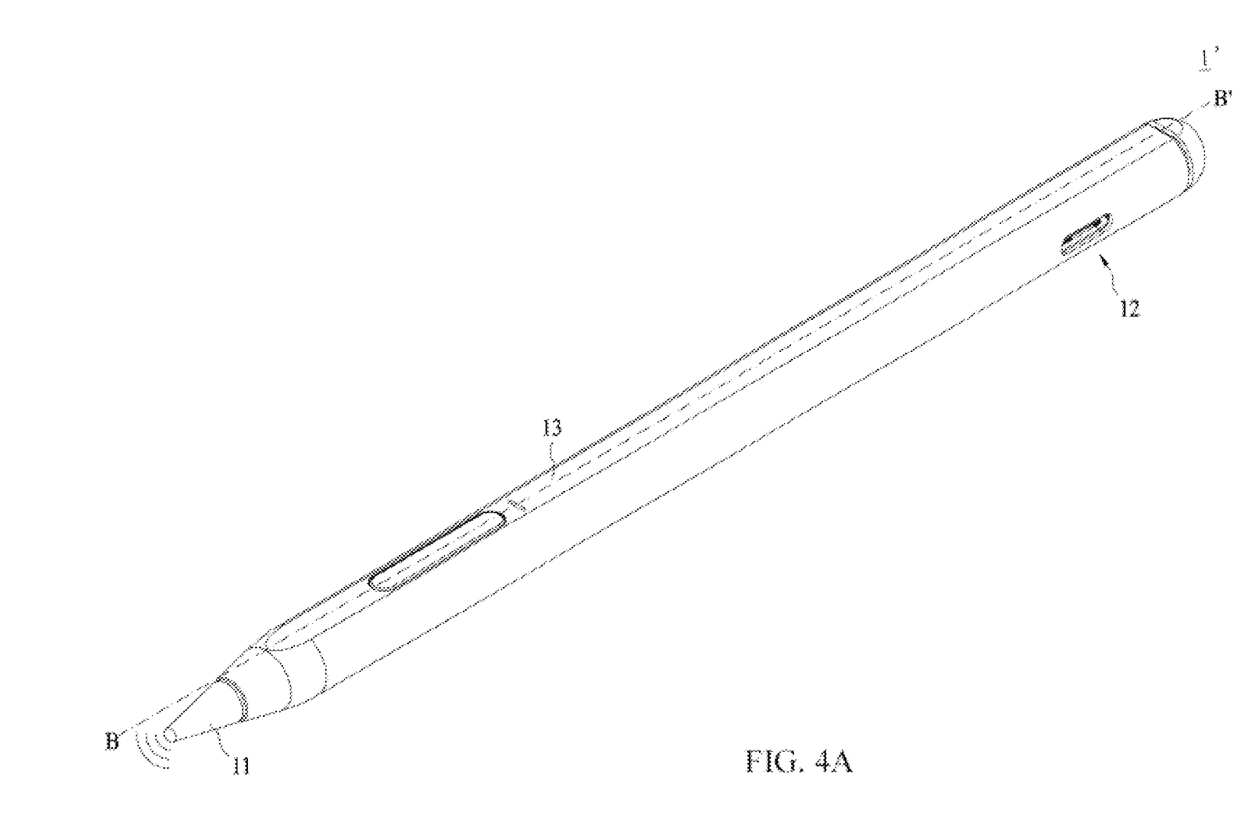
FIG. 4A is a schematic view of an active stylus of one embodiment of the present disclosure.
Figure 4B:
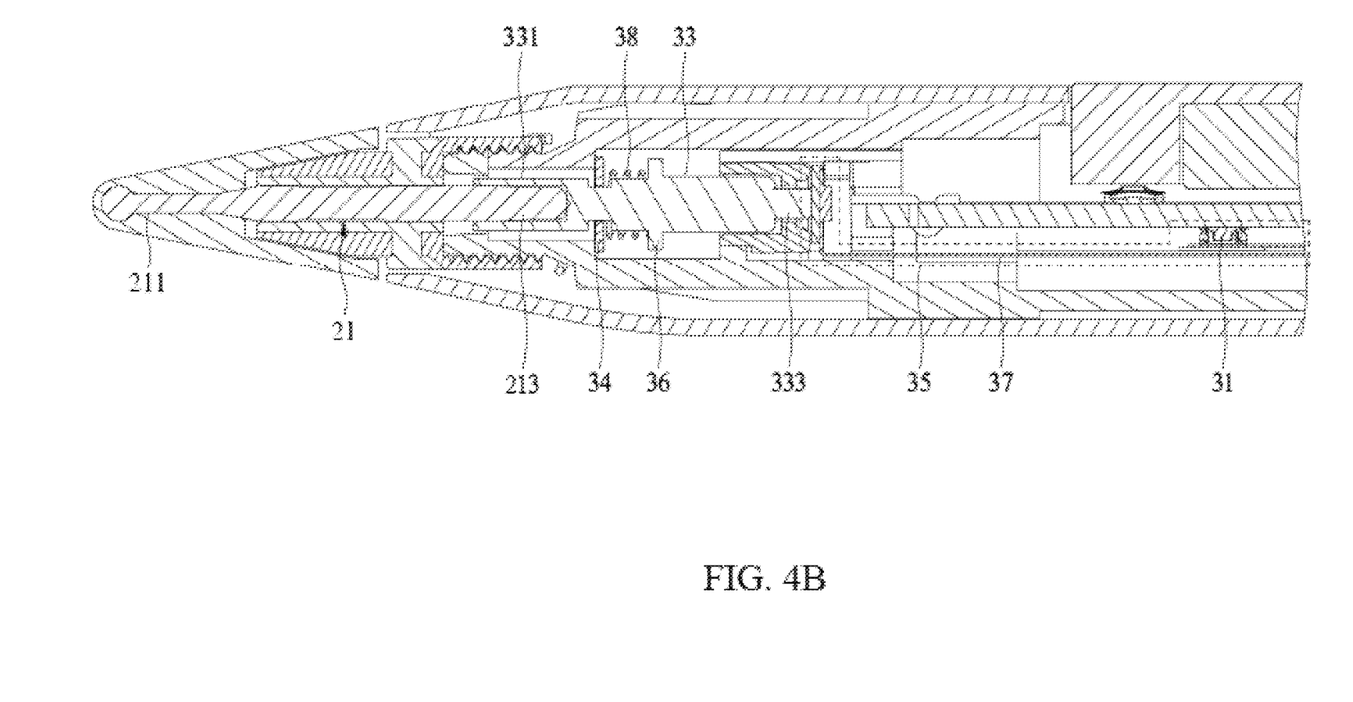
FIG. 4B is a cross-sectional view alone an BB' line of the active stylus of FIG. 4A.

FIG. 4A is a schematic view of an active stylus 1' of one embodiment of the present disclosure. FIG. 4B is a cross-sectional view alone an BB' line of the active stylus 1' of FIG. 4A. As shown in FIGS. 4A to 4B, the active stylus 1' includes the tip 11, the metal pin 21 and the metal shaft 13. In this embodiment, the first end 211 of the metal pin 21 is wrapped in the tip 11. In one embodiment, the tip 11 includes a silicon tip. The metal shaft 13 includes an accommodation cavity. The accommodation cavity has the opening 23. The second end 213 of the metal pin 21 is coupled to the signal processing module via the opening 23. In this embodiment, the metal pin is configured to broadcast a touch control signal from the signal processing module with a wireless transmission protocol. As shown in FIG. 4B, a charging port 12 is configured to allow an external power source to charge the battery of the active stylus 1. In one embodiment, the charging port 12 includes a USB Type-C charging port.

As shown in FIG. 4B, the signal processing module includes the pin holder 33 and the sensing module 35. In this embodiment, the first end of the pin holder 33 is formed the holding portion 331. The holding portion 331 is configured to hold the second end 213 of the metal pin 21. In this embodiment, the sensing module 35 further includes the metal sheet 351, the sensor 353 and the micro control unit (MCU) 31. The second end 333 of the pin holder 33 is directly contacted to the first side of metal sheet 351. The sensor 353 is located on the second side of the metal sheet 351. The first side of the metal 351 is opposite to the second side of the metal sheet 351. In this embodiment, as shown in FIG. 4B, since the second end 333 of the pin holder 33 is directly contact to the first side of the metal sheet, the active stylus 1 only requires a preloaded spring 38 located between a snap ring 34 and clamp blocks 36. Therefore, the preloaded stroke of the active stylus 1 is then reduced.

In this embodiment, the second end 333 of the pin holder 33 presses, in response to the axial movement of the metal pin 21, the first side of the metal sheet 351 and the metal sheet 351 is then deformed. A sensing signal is generated, in response to the sensed deformation of the metal sheet 351, by the sensor 353. In this embodiment, the sensor 353 includes integrated circuits. The metal sheet 351 is coupled to the MCU 31 by a flexible printed circuit (FPC) 37. Moreover, the FPC 37 is bonded with the metal sheet 351 with conductive adhesive. A touch control signal is generated, in response to the sensing signal, by the MCU 31. The touch control signal is transmitted to the metal pin 21 via the FPC 37, the conductive adhesive, the metal sheet 351 and the pin holder 33. The touch control signal is then broadcasted, with a wireless transmission protocol, by the metal pin 21. In this embodiment, the wireless transmission protocol includes Bluetooth.

The embodiments shown and described above are only examples and do not limit the patent scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An active stylus, comprising:
   a tip;
   a metal pin including a first end wrapped in a tip shell;
   a metal shaft including an accommodating cavity having an opening;
   a signal processing module accommodated in the accommodating cavity; and
   an elastic ring located between the tip and the opening, wherein a second end of the metal pin goes through the elastic ring and the opening, and is coupled to the signal processing module;
   wherein the signal processing module includes:
   a pin holder having a first end formed a holding portion, wherein the holding portion is configured to hold the second end of the metal pin;
   a sensing module further comprising:
   a metal sheet, wherein a second end of the pin holder directly contacts to a first side of the metal sheet and the metal sheet is deformed in response to an axial movement of the pin holder and the metal pin;
   a sensor located at a second side of the metal sheet and the sensor configured to generate a sensing signal in response to sensed deformation of the metal sheet, wherein the first side of the metal sheet is opposed to the second side of the metal sheet; and
   a micro control unit (MCU) coupled to the metal sheet by a flexible printed circuit FPC), wherein the FPC is bonded with the metal sheet by conductive adhesive and wherein the MCU is configured to generate a touch control signal in response to the sensing signal;
   wherein the metal pin is configured to broadcast the touch control signal from the signal processing module with a wireless transmission protocol; and
   wherein the elastic ring is configured to provide an impact-proof protection.

2. The active stylus of claim 1, wherein the sensor includes integrated circuits.

3. The active stylus of claim 1, wherein the elastic ring includes a stopping portion configured to be stopped in a stopping groove close to the opening of the accommodating cavity.

4. The active stylus of claim 1, wherein the elastic ring includes a rubber elastic ring.

5. The active stylus of claim 1, wherein the elastic ring includes a silicone elastic ring.

6. The active stylus of claim 1, wherein the tip includes a silicone tip.

7. An active stylus, comprising:
   a tip;
   a metal pin including a first end wrapped in a tip shell;
   a metal shaft including an accommodating cavity having an opening and the accommodating cavity configured to accommodate a pin holder and a sensing module, wherein the pin holder includes a first end formed a holding portion and the holding portion is configured to hold a second end of the metal pin via the opening;
   wherein the sensing module further includes:
   a metal sheet, wherein a second end of the pin holder directly contacts to a first side of the metal sheet and the metal sheet is deformed in response to an axial movement of the pin holder and the metal pin;
   a sensor located at a second side of the metal sheet and the sensor configured to generate a sensing signal in response to sensed deformation of the metal sheet, wherein the first side of the metal sheet is opposed to the second side of the metal sheet; and
   a micro control unit (MCU) coupled to the metal sheet by a flexible printed circuit (FPC), wherein the FPC is bonded with the metal sheet by conductive adhesive and the MCU is configured to generate a control signal in response to the sensing signal; and
   wherein the metal pin is configured to broadcast a touch control signal from a signal processing module with a wireless transmission protocol.

8. The active stylus of claim 7, wherein the sensor includes integrated circuits.

9. The active stylus of claim 7 further comprising an elastic ring located between the tip and the opening, wherein the second end of the metal pin goes through the elastic ring and the opening, and is held by the holding portion.

10. The active stylus of claim 9, wherein the elastic ring includes a rubber elastic ring.

11. The active stylus of claim 9, wherein the elastic ring includes a silicon elastic ring.

12. The active stylus of claim 7 further comprising an elastic ring located between the tip and the opening, wherein the second end of the metal pin goes through the elastic ring and the opening, and is held by the holding portion, wherein the elastic ring includes a stopping portion configured to be stopped in a stopping groove close to the opening of the accommodating cavity.

13. An active stylus, comprising:
   a tip;
   a metal pin including a first end wrapped in a tip shell;
   a metal shaft including an accommodating cavity having an opening, wherein the accommodating cavity is configured to accommodate a pin holder having a first end formed a holding portion and a sensing module; and
   an elastic ring located between the tip and the opening;
   wherein a second end of the metal pin goes through the elastic ring and the opening, and is held by the holding portion;
   wherein the sensing module further comprising:
   a metal sheet, wherein a second end of the pin holder directly contacts to a first side of the metal sheet and the metal sheet is deformed in response to an axial movement of the pin holder and the metal pin;

a sensor located at a second side of the metal sheet and the sensor configured to generate a sensing signal in response to sensed deformation of the metal sheet, wherein the first side of the metal sheet is opposed to the second side of the metal sheet; and a micro control unit (MCU) coupled to the metal sheet by a flexible printed circuit (FPC), wherein the FPC is bonded with the metal sheet by conductive adhesive and the MCU is configured to generate a touch control signal in response to the sensing signal; and wherein the metal pin is configured to broadcast the touch control signal from a signal processing module with a wireless transmission protocol.

14. The active stylus of claim 13, wherein the elastic ring includes a rubber elastic ring.

15. The active stylus of claim 13, wherein the elastic ring includes a silicon elastic ring.

16. The active stylus of claim 13, wherein the elastic ring includes a stopping portion configured to be stopped in a stopping groove close to the opening of the accommodating cavity.

17. The active stylus of claim 13, wherein the sensor includes integrated circuits.

* * * * *